US006548202B2

(12) United States Patent
Campbell et al.

(10) Patent No.: US 6,548,202 B2
(45) Date of Patent: Apr. 15, 2003

(54) CARBON-SUPPORTED CATALYSTS FOR FUEL CELLS

(75) Inventors: Stephen A. Campbell, Maple Ridge (CA); Jason Edward Chisham, Vancouver (CA); David P. Wilkinson, North Vancouver (CA)

(73) Assignee: Ballard Power System, Inc., Burnaby (CA)

( * ) Notice: Subject to any disclaimer, the term of this patent is extended or adjusted under 35 U.S.C. 154(b) by 162 days.

(21) Appl. No.: 09/799,183

(22) Filed: Mar. 5, 2001

(65) Prior Publication Data

US 2001/0009733 A1 Jul. 26, 2001

Related U.S. Application Data

(63) Continuation of application No. 09/379,196, filed on Aug. 20, 1999, now abandoned, which is a continuation-in-part of application No. 09/036,389, filed on Mar. 6, 1998, now Pat. No. 6,074,773.
(60) Provisional application No. 60/098,269, filed on Aug. 28, 1998.

(51) Int. Cl.[7] .................................................. H01M 4/96
(52) U.S. Cl. .............................. 429/44; 429/40; 429/30; 429/12; 429/13
(58) Field of Search ............................ 429/44, 30, 40, 429/12, 13

(56) References Cited

U.S. PATENT DOCUMENTS

| 3,769,093 | A |   | 10/1973 | Jones ........................... 136/120 |
| 4,500,395 | A |   | 2/1985  | Nakamura ..................... 204/284 |
| 5,084,144 | A |   | 1/1992  | Reddy et al. ................. 205/104 |
| 5,185,218 | A |   | 2/1993  | Brokman et al. .............. 429/27 |
| 5,186,877 | A |   | 2/1993  | Watanabe ..................... 264/104 |
| 5,346,780 | A |   | 9/1994  | Suzuki ........................... 429/42 |
| 5,501,915 | A |   | 3/1996  | Hards et al. ................... 429/42 |
| 5,561,000 | A |   | 10/1996 | Dirven et al. .................. 429/42 |
| 5,766,788 | A |   | 6/1998  | Inoue et al. .................... 429/42 |
| 5,876,867 | A | * | 3/1999  | Itoh et al. ....................... 429/44 |
| 6,074,773 | A |   | 6/2000  | Wilkinson et al. ............. 429/41 |

FOREIGN PATENT DOCUMENTS

| EP | 0 305 565 | 3/1989 |
| EP | 0 520 469 | 12/1992 |

(List continued on next page.)

OTHER PUBLICATIONS

Maoka, "Electrochemical reduction of oxygen on Small Platinum Particles Supported on Carbon in concentrated Phosphoric acid," *Electrochem, Acta, 33(3)*:371–377 (1985).

Watanabe, et al., "Experimental Analysis of the Reaction Layer Structure in a Gas Diffusion Electrode," *Journal of Electroanalytical Chemistry* 95: 81–93 (1985).

Kinoshita, "Carbon Electrochemical and Physicochemical Properties," John Wiley & Sons, Inc., New York, USA, pp. 86–88 (1988).

(List continued on next page.)

*Primary Examiner*—Carol Chaney
*Assistant Examiner*—Angela J Martin
(74) *Attorney, Agent, or Firm*—McAndrews, Held & Malloy, Ltd.

(57) ABSTRACT

Carbon-supported catalysts are frequently employed in the electrodes of solid polymer fuel cells in order to make efficient use of the catalyst therein. The catalyst utilization in the electrode and the fuel cell performance can be further improved by introducing acidic surface oxide groups on the carbon-supported catalyst. The introduction of acidic surface oxide groups on the carbon-supported catalyst can be accomplished by treating the carbon-supported catalyst with a suitable acid, such as nitric acid, before incorporating the carbon-supported catalyst in a fuel cell electrode. The present technique is particularly suitable for use in solid polymer fuel cell cathodes.

27 Claims, 7 Drawing Sheets

FOREIGN PATENT DOCUMENTS

| | | |
|---|---|---|
| FR | 2 385 228 | 10/1978 |
| FR | 2 404 312 | 4/1979 |
| JP | 59-225740 | 12/1984 |
| JP | 61-67789 | 4/1986 |
| JP | 2-049356 | 2/1990 |
| JP | 4-206153 | 7/1992 |
| JP | 7-176310 | 7/1995 |
| JP | 9-320611 | 12/1997 |
| JP | 10-189003 | 7/1998 |
| WO | WO 96/12317 | 4/1996 |

OTHER PUBLICATIONS

"Standard Test Methods for Carbon black—pH Value[1]," ASTM Designation: D 1512–95 (1995).

Uchida, et al., "Investigation of the Microstructure in the Catalyst Layer and Effects of Both Perfluorosulfunate Ionomer and PTFE–Loaded Carbon on the Catalyst Layer of Polymer Electrolyte Fuel Cells", *J. Electrochem. Soc., 142*(12):4143–4149 (Dec., 1995).

Uchida, et al., "Effects of Microstructure of Carbon Support in the Catalyst Layer on the Performance of Polymer–Electrolyte Fuel Cells," *J. Electrochem. Soc., 143*(7)2245–2252 (Jul., 1996).

Moreno–Castilla, et al., "The Creation of Acid Carbon Surfaces by Treatment with $(NH_4)_2S_2O_8$,"Carbon 35(10–11):1619–1626 (1997).

Amine, et al., "New Process for Loading Highly Active Platinum on Carbon Black Surface for Application in Polymer Electrolyte Fuel Cell," *Ann. Chem. Sci. Mat., 23*:331–335 (1998).

Wang, et al., "Effects of Acidic Treatments on the Pore and Surface Properties on Ni Catalyst Supported on Activated Carbon," *Carbon 36(3)*:283–292 (1998).

Webster's II New Riverside University Dictionary, pp. 615 and 875 (1988).

Not being submitted.

\* cited by examiner

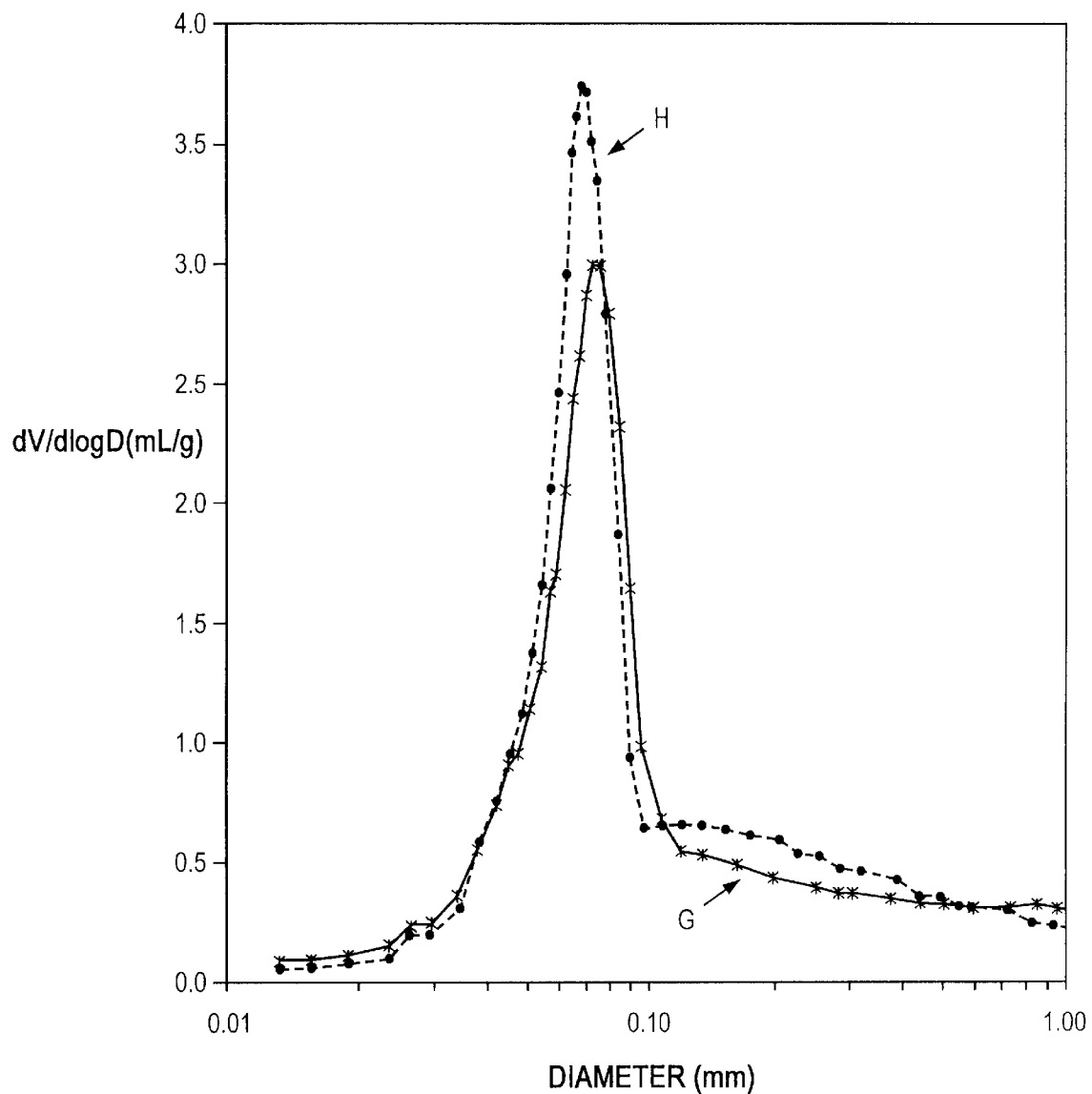

CARBON-SUPPORTED CATALYSTS FOR FUEL CELLS

CROSS-REFERENCE TO RELATED APPLICATION

This application is a continuation of U.S. patent application Ser. No. 09/379,196, filed on Aug. 20, 1999, now abandoned, which is related to and claims priority benefits from U.S. Provisional Patent Application Ser. No. 60/098,269 filed on Aug. 28, 1998, entitled "Carbon-Supported Catalysts For Fuel Cells". The '196 application is, in turn, a continuation-in-part and claims priority benefits from U.S. patent application Ser. No. 09/036,389, filed Mar. 6, 1998, entitled "Impregnation of Microporous Electrocatalyst Particles for Improving Performance in an Electrochemical Fuel Cell", now U.S. Pat. No. 6,074,773 issued Jun. 13, 2000. The '196 application and the '269 provisional application are each incorporated herein by reference in their entirety.

FIELD OF THE INVENTION

The present invention relates to improvements in the performance of carbon-supported catalysts in solid polymer fuel cells. In particular, the invention relates to surface treatments for improving the performance of carbon-supported catalysts, especially at the cathode.

BACKGROUND OF THE INVENTION

Fuel cell systems are potentially more efficient and cleaner than present day power supplies that burn fossil fuels. As a result, much effort has recently been directed towards developing fuel cell systems that are suitable for consumer use over a wide range of applications, from the small (for example, portable 1 kilowatt size generators) to the large (for example, automotive engines or stationary power plants). One of the development objectives relates to lowering costs so that fuel cell systems can be competitive with traditional fossil fuel burning alternatives.

Electrochemical fuel cells convert reactants, namely, fuel and oxidant fluid streams, to generate electric power and reaction products. Electrochemical fuel cells generally employ an electrolyte disposed between two electrodes, namely a cathode and an anode. An electrocatalyst is needed to induce the desired electrochemical reactions at the electrodes. In addition to electrocatalyst, the electrodes may also comprise an electrically conductive substrate upon which the electrocatalyst is deposited. The electrocatalyst may be a metal black, an alloy or a supported metal-based catalyst, for example, platinum on carbon particles.

A particularly attractive fuel cell is the solid polymer electrolyte fuel cell that employs a membrane electrode assembly ("MEA"). The MEA comprises a solid polymer electrolyte or ion-exchange membrane disposed between the two electrode layers. Solid polymer fuel cells operate at relatively low temperatures (circa 80° C.) compared to other fuel cell types.

A broad range of reactants can be used in electrochemical fuel cells. For example, the fuel stream may be substantially pure hydrogen gas, a gaseous hydrogen-containing reformate stream, or methanol in a direct methanol fuel cell. The oxidant may be substantially pure oxygen or a dilute oxygen stream such as air.

The electrochemical oxidation that occurs at the anode electrocatalyst of a solid polymer electrochemical fuel cell results in the generation of cationic species, typically protons and electrons. For an electrochemical fuel cell to utilize the ionic reaction products, the ions must be conducted from the reaction sites at which they are generated to the electrolyte. Accordingly, the electrocatalyst is typically located at the interface between each electrode and the adjacent electrolyte.

Effective electrocatalyst sites are accessible to the reactant, are electrically connected to the fuel cell current collectors, and are ionically connected to the fuel cell electrolyte. For example, if the fuel stream supplied to the anode is hydrogen, electrons and protons are generated at the anode electrocatalyst. The electrically conductive anode is connected to an external electric circuit that conducts an electric current from the anode to the cathode. The electrolyte is typically a proton conductor, and protons generated at the anode electrocatalyst migrate through the electrolyte to the cathode. Electrocatalyst sites that are ionically isolated from the electrolyte are not productively utilized if the protons do not have a mechanism for being ionically transported to the electrolyte. Accordingly, coating the exterior surfaces of the electrocatalyst particles with ionically conductive coatings has been used to increase the utilization of electrocatalyst exterior surface area and increase fuel cell performance by providing improved ion conducting paths between the electrocatalyst surface sites and the electrolyte.

A measure of electrochemical fuel cell performance is the voltage output from the cell for a given current density. Higher performance is associated with a higher voltage output for a given current density or higher current density for a given voltage output. Increasing effective utilization of the electrocatalyst surface area enables the same amount of electrocatalyst to induce a higher rate of electrochemical conversion in a fuel cell resulting in improved performance.

Although only small amounts of catalyst are used at the electrode/electrolyte interfaces, the usual catalyst materials are expensive and they can represent a substantial fraction of the overall fuel cell cost. For instance, solid polymer fuel cells commonly employ a platinum catalyst at the cathode and a platinum-ruthenium catalyst alloy at the anode. It is therefore important to use catalyst material as efficiently as possible. This includes increasing utilization, (for example by increasing the available active catalyst surface per unit weight of catalyst).

U.S. Pat. No. 5,084,144 discloses a method for making fuel cell electrodes. The catalyst is electrochemically deposited on the surface of the electrodes via a layer of proton-conducting polymer electrolyte. As a result, a thin layer of catalyst is only deposited where it is accessible to a proton-conducting electrolyte. Such an electrochemical deposition technique may be difficult, however, to implement economically in large scale production.

More commonly, catalyst is incorporated in fuel cell electrodes by applying a high surface area catalyst powder in a thin layer on an electrode substrate. The catalyst powder is typically mixed with an ionomer electrolyte solution to form an ink that is applied to the electrode substrate. The ionomer in the ink remains in intimate contact with the catalyst after removal of the solvent and thus provides electrolyte access to the dispersed catalyst.

A preferred way to obtain a high surface area catalyst powder is to disperse the desired catalyst on the surface of a larger particulate support. High surface area carbon blacks are preferred supports in this regard. It is relatively economical to prepare electrodes comprising a thin layer of carbon-supported catalyst coated on an electrode substrate. While the utilization of the catalyst in a typical fuel cell electrode is satisfactory, it is nevertheless desirable to improve the utilization.

Carbon-supported catalysts have historically been prepared by depositing the metal-based catalyst onto the porous carbon support material surface. Recently, improved ion exchange methods have been adopted to prepare certain carbon-supported catalysts. See, for example, Ann. Chim. Sci. Mat., 1998, Vol. 23, p331–335. In these methods, a suitable carbon support is treated with a strong oxidizing solution thereby creating many active acidic surface oxide groups on the carbon surface which can serve as ion exchange sites. Surface oxides which can form on carbon and specifically acidic surface oxides which can form on carbon are discussed in Table 3.1, pages 86–88 in "Carbon, electrochemical and physicochemical properties", K. Kinoshita, John Wiley & Sons, Inc., New York, U.S.A., 1988. Acidic surface oxide groups include carbonyl, carboxylic, phenolic, quinones, lactones, groups containing one or two oxygen atoms, and the like. A slurry is made which contains the treated carbon support and a solution containing a suitable metal catalyst salt or complex. Cations from the solution (e.g. $Pt(NH_4)_3^{2+}$) exchange with protons at the active sites. Afterwards, the sample is heated in air to form platinum oxides and is then heated in a reducing environment (for example, hydrogen) to convert the bound platinum species to an active metallic form. This method desirably results in highly dispersed, small particle platinum deposits exhibiting a high surface area. The reducing treatment to form platinum metal, however, removes most of the remaining surface oxide groups on the carbon support.

SUMMARY OF THE INVENTION

In solid polymer fuel cell applications, significant improvement can be achieved in the performance of electrodes incorporating carbon-supported catalysts. It has been discovered that electrode, and therefore fuel cell performance, is enhanced when the surface of the carbon-supported catalyst comprises more acidic surface oxide groups than in conventional carbon-supported catalysts. Preferably, there should be sufficient acidic surface groups such that the pH of the carbon-supported catalyst is less than about 5. A particularly significant performance improvement may be obtained when the pH of the carbon-supported catalyst is less than about 3. In particular, the performance of a fuel cell cathode supplied with a gaseous reactant can be enhanced. Preferably the carbon-supported catalyst comprises platinum and the carbon support is an acetylene or furnace black.

Introducing more than the conventional amount of acidic surface oxide groups on the carbon-supported catalyst can be accomplished by chemically treating the carbon-supported catalyst with an oxidant, such as, for example, a solution comprising an oxidizing species. The oxidizing chemical treatment is performed on the carbon-supported catalyst after the metal-based catalyst has been deposited on the carbon.

In principle, any preferred oxidizing species may be employed in the treatment solution, including $HNO_3$, $H_3PO_4$, $KMnO_4$, $KClO_3$, $HF$, or $(NH_4)_2S_2O_8$. Preferably a strong oxidizing solution is used. Preferred acidic solutions include $HNO_3$ in concentrations greater than about 4M or $H_3PO_4$ in concentrations greater than about 5M. Successful results can be obtained with the former by treating at room temperature or above for more than about 1 hour, or with the latter by treating above about 100° C. for more than about 1 hour. Lower treatment temperatures are preferred in order to prevent Ostwald ripening. (Ostwald ripening refers to the tendency of smaller catalyst particles to coalesce into larger particles, thereby reducing the active area.)

After treating with an oxidizing solution, the residual solution may be removed simply by filtration and washing the oxidized carbon-supported catalyst in water, drying the oxidized carbon-supported catalyst filter cake, and then grinding the cake to obtain free flowing oxidized carbon-supported catalyst. The drying can be performed below about 80° C. in air.

While low temperature chemical treatments are preferred, other techniques may be employed to reduce the pH of (that is, by introducing more than the conventional amount of acidic surface groups on) a carbon-supported catalyst. For example, this may be achieved by omitting or modifying steps in the conventional preparation of carbon-supported catalysts. For instance, sufficient acidic surface groups may exist on the carbon support during ion exchange deposition of the metal-based catalyst but, as described above, they are typically subsequently removed by post-deposition processing steps. Omitting or modifying these post-processing steps may also produce suitable catalysts with lower than conventional pH.

In fuel cell electrodes, a carbon-supported catalyst is typically applied to an electrode substrate (typically a porous, electrically conductive sheet material) and/or to the membrane. Often, carbon-supported catalysts are applied in the form of an ionomer ink, which comprises an ionomer solution (e.g. an aqueous solution of a poly (perfluorosulphonic acid), and the oxidized carbon-supported catalyst. In this way, the ionomer is in intimate contact with the carbon-supported catalyst. The oxidative treatment described herein is preferably performed before the carbon-supported catalyst is made into an ionomer ink and applied to the electrode substrate, or otherwise incorporated in a fuel cell electrode.

BRIEF DESCRIPTION OF THE DRAWINGS

FIG. 7 shows the pore size distributions of the $HNO_3$ treated sample G and the untreated sample H of Example 3.

DETAILED DESCRIPTION OF THE PREFERRED EMBODIMENTS

Figure 1:
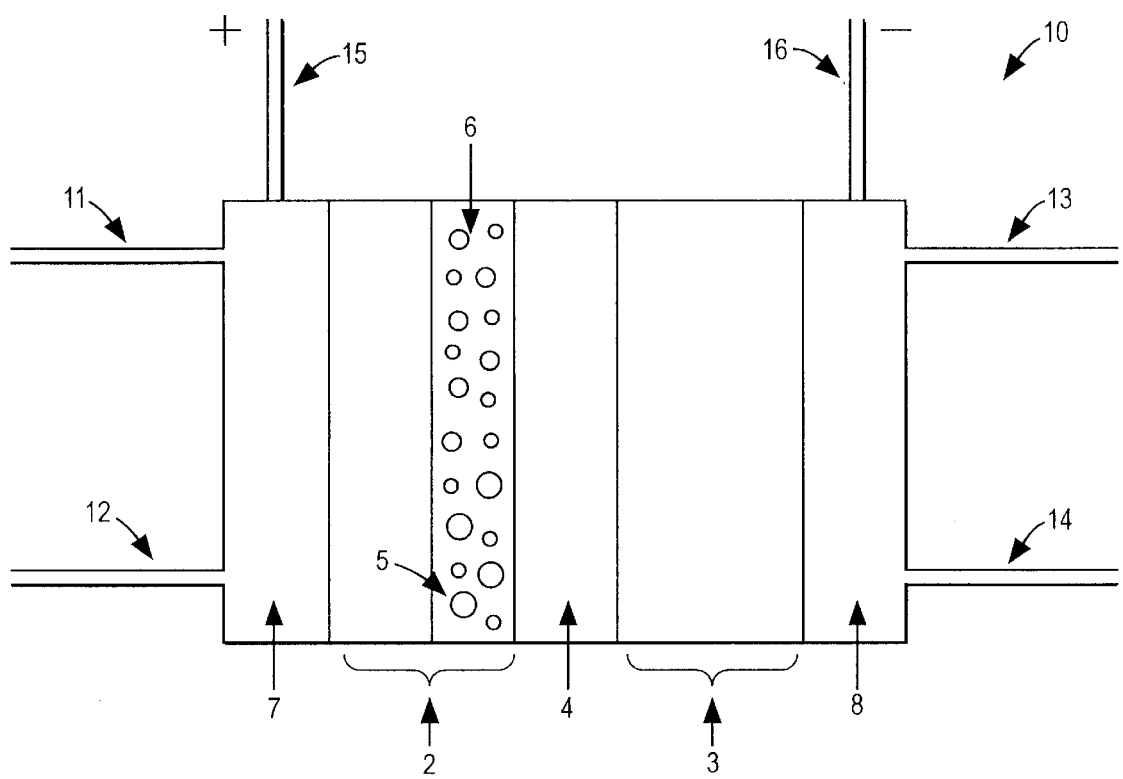
FIG. 1 is a schematic diagram of a solid polymer fuel cell including an electrode comprising a substrate and a carbon-supported catalyst.

Enhanced fuel cell performance is obtained through use, in a solid polymer fuel cell electrode, of a carbon-supported catalyst having greater than conventional levels of acidic surface oxide groups thereon. A carbon-supported catalyst pH less than conventional is indicative of these groups. Conventional pH levels appear to be greater than about 5. Herein, pH refers to the value determined by the ASTM standard test method for carbon black, ASTM # D1512-95 Test Method B—sonic slurry test method. This test, which can be applied to carbon-supported catalyst samples, involves measuring the pH of an aqueous slurry containing a carbon black in a specific amount of water. (Note that other methods may be employed to measure the acidity of a carbon-supported catalyst. However, values determined by other methods may not always simply correlate with that of the ASTM method. For instance, a titration method may be employed instead. If the carbon-supported catalyst sample contains residual acid from the preparation process, it may be washed repeatedly in water until no additional acid is removed. The wash water can then be titrated to determine the amount of "free" acid on the carbon-supported catalyst sample. Then, the sample may be subjected to an ion exchange process, in a NaCl solution for example, and the solution may then be titrated to determine the amount of "bound" acid on the carbon-supported catalyst sample. Such a method may distinguish residual acid from the acidic surface oxide groups.)

A simple way to obtain such a carbon-supported catalyst is to introduce pendant surface oxide groups onto a conventional carbon-supported catalyst by exposing the carbon-supported catalyst to a suitable oxidizing environment. Various oxidizing methods are known, but a chemical treatment using an oxidizing solution is preferred. Various known oxidizing species can be employed in such a solution, including $HNO_3$, $H_3PO_4$, $KMnO_4$, $KClO_3$, HF, or $(NH_4)_2S_2O_8$. However, species which are less hazardous and which are readily available such as $HNO_3$, $KMnO_4$, or $(NH_4)_2S_2O_8$ are preferred. Stronger oxidizing species may be preferable in order to hasten the treatment process. Satisfactory results have been obtained, however, in the Examples described below with both $HNO_3$ and the weaker acid $H_3PO_4$. $(NH_4)2S_2O_8$ may offer advantages in that it appears to produce stronger acid groups on treated activated carbons than does $HNO_3$, even though $HNO_3$ creates larger amounts of oxygen surface complexes. As a further advantage, $(NH_4)_2S_2O_8$ appears not to affect the surface area and pore structure of treated activated carbons as much as $HNO_3$ does (see article by C. Moreno-Castilla et al., Carbon, Vol. 35, No. 10–11, p. 1619, 1997).

The steps involved in chemically treating a conventional carbon-supported catalyst can be relatively simple. For instance, the carbon-supported catalyst may be treated with a strong aqueous acidic solution at an elevated temperature, thereby oxidizing the surface. The preferred concentration of the acid solution, the treatment temperature, and the duration of the treatment will depend on several variables including the acid selected, the nature of the carbon support, and the extent of oxidation required. Some non-inventive empirical trials may be required in order to optimize a treatment for any given carbon-supported catalyst composition for any given application. The parameters that provided satisfactory results in the following Examples also provide guidelines for such optimization. Thus, treatment with strong acidic solutions such as 4 M $HNO_3$ at temperatures above about 60° C. for 1 hour or more may be sufficient. Higher concentrations, higher treatment temperatures, and/or longer times may be required when using weaker acids.

Once the desired oxidation treatment is completed, the carbon-supported catalyst powder is separated from the solution. This can be readily accomplished by washing the powder with water, filtering it, drying the filter cake, and then grinding up the cake to provide a free-flowing powder. $HNO_3$ is a preferred choice for the oxidizing species in the treatment solution since it is readily removed afterward.

In the following, several terms are used to describe certain electrochemical characteristics of carbon-supported catalysts, particularly carbon-supported platinum catalysts. Herein, the electrochemical surface area of the catalyst (ECA) is defined as the catalyst surface area as determined by conventional CO stripping voltammetry in an ex-situ (that is, not in a fuel cell) test configuration. The effective platinum surface area (EPSA) is a dimensionless parameter defined as the catalyst electrochemical surface area divided by the geometric area of the test electrode. EPSA is also determined by CO stripping voltammetry, but is performed in-situ (that is, in a fuel cell). Thus, ECA more closely measures the total catalyst surface area that is accessed by CO while EPSA measures the catalyst surface that is accessed both by CO and a fuel cell electrolyte. The utilization of the catalyst in an electrode is defined as the EPSA divided by (ECA * electrode loading in grams platinum per $m^2$ electrode), which is indicative of the fraction of available catalyst surface that is actually utilized in fuel cell operation.

For treated carbon-supported platinum catalysts, it has been observed that the EPSA increases as may be expected if the catalyst performance in a fuel cell has been improved. An increase in the measured EPSA is indicative of increased reactant access to the available platinum on the carbon support. However, surprisingly, it was also observed that the ECA may decrease as a result of the treatment. A decrease in ECA is generally indicative of a loss in platinum surface accessible to reactant gases and would generally be assumed to be detrimental and not an advantage. Nonetheless, a significant net improvement associated with treatment has been observed.

It is expected that the treatment of any carbon-supported catalyst may result in enhanced fuel cell performance, particularly at higher current densities where mass transport issues related to proton conduction are greater. Platinum is a preferred catalyst for use at the cathode of solid polymer fuel cells. The present technique may also be employed to obtain improvements on an anode. However, a common catalyst used in solid polymer fuel cell anodes is Pt—Ru and acid treatments may dissolve the Ru component. Further, present day anode performance is much better than cathode performance and so the greatest fuel cell improvements are expected to come from improvements at the cathode. The carbon support in the carbon-supported catalyst preferably has many sites for the formation of acidic surface oxide groups and is thus preferably a disordered carbon or carbon black, rather than a highly graphitic one. Such carbons are similarly preferred in the making of conventional carbon-supported catalysts by ion exchange methods.

Instead of forming pendant surface oxide groups on an otherwise conventional carbon-supported catalyst, other alternative methods may also be considered. For instance, conventional carbon-supported catalysts can be prepared by ion exchange methods which involve forming acidic oxide groups on the surface of the carbon support as sites for ion exchange. While these groups are subsequently removed once the introduction of a metal catalyst through ion exchange has been accomplished, an omission or modification of certain process steps may still achieve a desired deposition of an active catalyst without losing the remaining surface groups. For instance, intermediate platinum oxides are generally reduced to platinum metal in commercial carbon-supported catalysts. For use in fuel cell cathodes, which are exposed to an oxidizing environment in the fuel cell, it may be satisfactory to employ the intermediate carbon-supported platinum oxide. If so, the reducing step and loss of oxide groups associated with that step can be avoided. Further, the intermediate carbon-supported platinum oxide may be acceptably reduced in the reducing environment of a fuel cell anode (that is, in situ). If so, the reducing step and loss of oxide groups associated with that step can be avoided can be avoided here too.

Having obtained a desired carbon-supported catalyst, the fabrication of electrodes and fuel cells using the electrodes can be done in a conventional manner. Typically, fuel cell electrodes are made by applying the carbon-supported catalyst to an electrode substrate (usually a carbon fiber sheet or the like). An ionomer ink is then prepared which comprises an aqueous ionomer solution and the carbon-supported catalyst, and the ionomer ink is applied to a substrate. After drying, portions of the catalyst are desirably in intimate contact with the ion conducting ionomer.

A fuel cell comprising a treated carbon-supported catalyst is shown in the schematic diagram in FIG. 1. Fuel cell assembly 10 contains at least one membrane electrode assembly (MEA) comprising a porous cathode 2 and a porous anode 3 that are bonded to a solid polymer membrane electrolyte 4. Treated carbon-supported catalyst 5 is disposed at the interface between cathode 2 and membrane electrolyte 4. Ionomer 6 is dispersed over the powder 5 thereby contacting both powder 5 and membrane electrolyte 4. (The catalyst layer on the anode is not shown.) Oxidant flow field 7 and fuel flow field 8 are pressed against cathode 2 and anode 3 respectively on the faces opposite the membrane electrolyte 4. Fuel cell assembly 10 has an oxidant inlet 11, an oxidant outlet 12, a fuel inlet 13, and a fuel outlet 14. Air and hydrogen may, for example, be used as the oxidant and fuel respectively. Electrical power is obtained from the fuel cell at positive and negative terminals 15 and 16 respectively.

No special requirement is imposed on the materials of construction used in the fuel cell because of the treatment. Unlike certain prior art fuel cells which included "free" sulfuric acid in and around an electrode to enhance proton conduction, the presence of the acidic surface oxide groups on the carbon-supported catalyst does not introduce a corrosion concern with regards to the fuel cell hardware.

Although not all of the theoretical aspects of the present technique are fully understood, surface treatment of the treated carbon-supported catalysts may lead to improvements for various reasons. Without being bound by theory, one possibility is that the presence of acidic surface oxide groups may greatly increase wetability of the catalyst particles by ionomer ink solution, thereby wetting more catalyst surface and thus improving utilization. Accordingly there may be a net increase observed in the effective catalyst surface area (which is accessible to the reactant, ionically connected to the electrolyte, and electrically connected to the fuel cell current collectors), even if there were a decrease in actual surface area accessible to a reactant. Also, if so, it would presumably be preferable to treat a carbon-supported catalyst before any application to a substrate via an ionomer ink. Another possibility is that even if catalyst coated micro- or meso-pores in the carbon support are not wetted with ionomer, the pores may be wetted with water which becomes proton conducting as a result of the presence of the pendant acidic oxide groups lining the surface of the pores. Again, this may improve catalyst utilization.

As a further consideration, it may be useful to impregnate the carbon-supported catalyst with acid by vacuum impregnation to more fully access the surfaces. Since it is suspected that the observed performance enhancement may be due, at least in part, to improved proton access to catalyst sites, particularly in pores, further enhancements may also be obtained by improving access of the reactants (for example, oxygen) to those sites. This may be accomplished by impregnating those pores with an impregnate having high oxygen solubility, such as certain fluoro-organic chemicals.

The following Examples have been included to illustrate different embodiments and aspects of the present technique but these should not be construed as limiting in any way. In the Examples set forth below, the carbon-supported Pt catalysts have been obtained from commercial sources and the preparation method is not known. Regardless of preparation method, the performance improvements noted below clearly cannot be attributed to improved dispersion of deposited Pt by way of the prior art ion exchange mechanism since the Pt catalyst has already been deposited. Another mechanism appears to be involved.

EXAMPLE 1

Carbon-supported catalyst comprising 10% by weight platinum deposited onto a Shawinigan acetylene black carbon support was obtained from Johnson Matthey. Acidic surface oxide groups were introduced by two different acid treatments. Sample A was treated in 5 M $HNO_3$ (100 mL acid solution/g carbon-supported catalyst) at 107° C. for 1 hour. The sample was then rinsed with water, filtered, and dried at 80° C. Sample B was treated in a similar manner except 5 M $H_3PO_4$ was employed. Sample C was left untreated for comparative purposes.

Fuel cell testing was then carried out using cathodes prepared using each of the three samples. First, the samples were mixed with Nafion™ ionomer solutions to make ionomer inks. Each ink was then applied to a face of a porous carbon electrode substrate, thereby creating a catalyst layer on the substrate. Anodes for the three fuel cell tests were made in a similar fashion using untreated carbon-supported Pt—Ru catalyst that was applied in a Nafion™ ink to porous carbon anode substrates. Membrane electrode assemblies were then made by bonding test cathodes and anodes onto opposite sides of a solid polymer membrane (catalyst layers facing the membrane).
Appropriate flow field plates were pressed against the electrodes and other conventional fuel cell hardware was used to complete the fuel cell assemblies.

Figure 2:
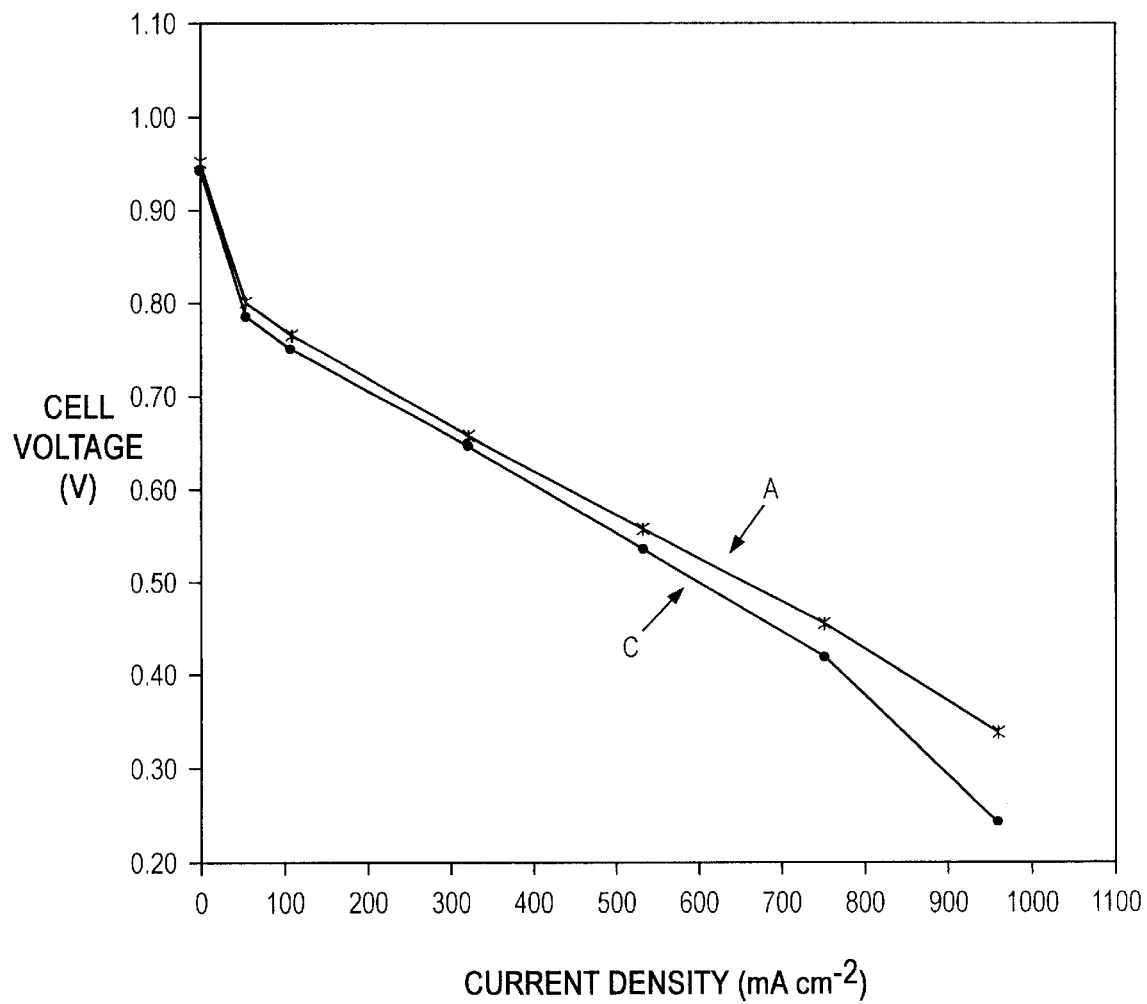
FIG. 2 is a composite plot of fuel cell voltage as a function of current density for $HNO_3$ treated catalyst sample A and for the untreated sample C of Example 1.
Figure 3:
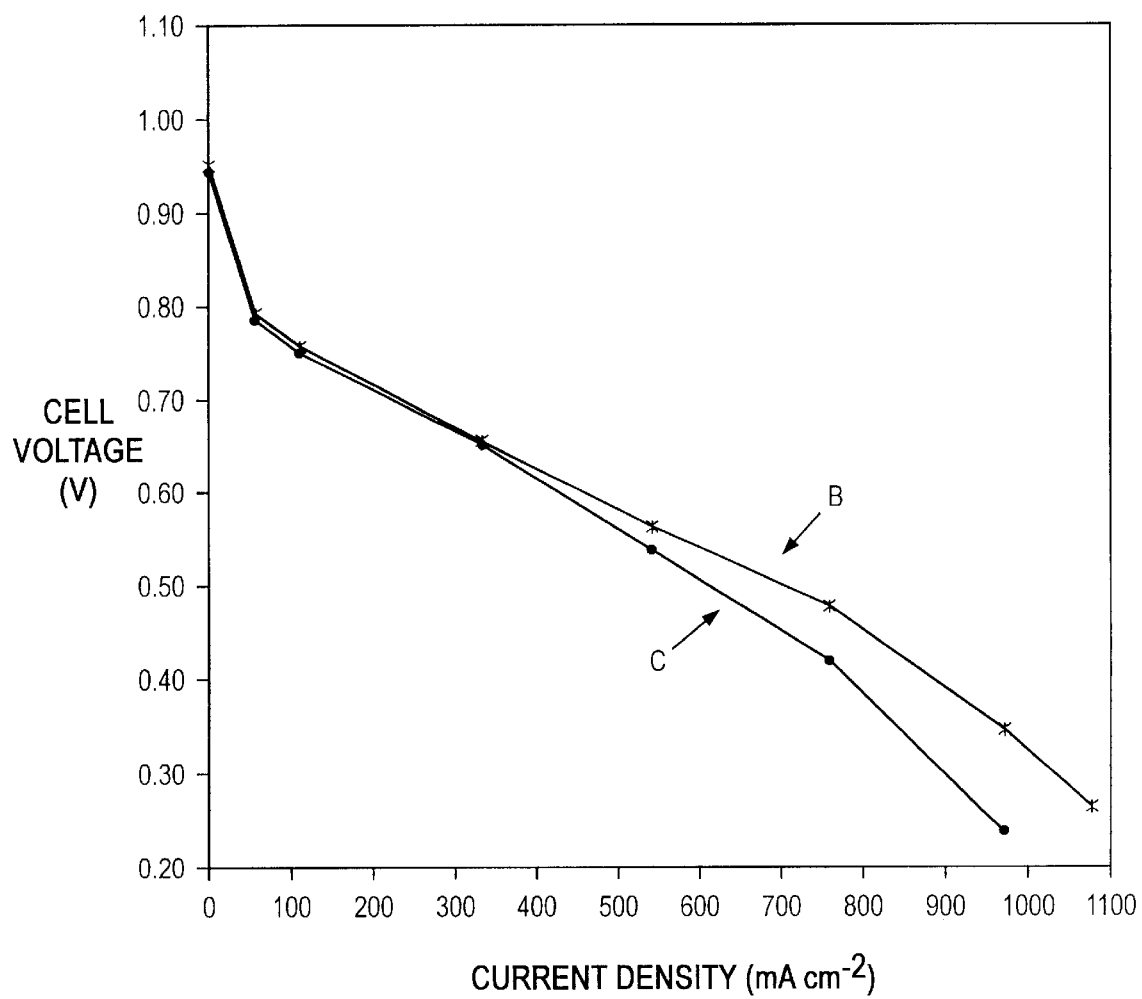
FIG. 3 is a composite plot of fuel cell voltage as a function of current density for $H_3PO_4$ treated catalyst sample B and for the untreated sample C of Example 1.

The fuel cells were then operated at 80° C. on pure hydrogen and air reactants at the anode and cathode respectively. The cell voltage versus current density characteristics for each fuel cell were determined and the results are shown in FIGS. 2 and 3. The former compares the performance of the $HNO_3$ treated sample A against untreated sample C. The latter compares the performance of the $H_3PO_4$ treated sample B against untreated sample C. Both treated samples show a significant improvement at the higher current densities.

EXAMPLE 2

The tests carried out in Example 1 were repeated, except in this example the carbon-supported catalyst employed was a commercially available product of Johnson-Matthey comprising 40% by weight platinum deposited on a Vulcan TM furnace black XC72R™ carbon support. Additionally, the samples were treated at room temperature using a vacuum impregnation technique. The samples were pumped down in a vacuum chamber and then a small amount of acid was introduced under vacuum. The chamber was then brought back up to ambient pressure and samples were immediately removed. Finally, samples were rinsed, filtered, and dried at 80° C. as in Example 1. Sample D was treated with 5 M $HNO_3$ and sample E was treated with 5 M $H_3PO_4$. Sample F was left untreated for comparative purposes.

Figure 4:
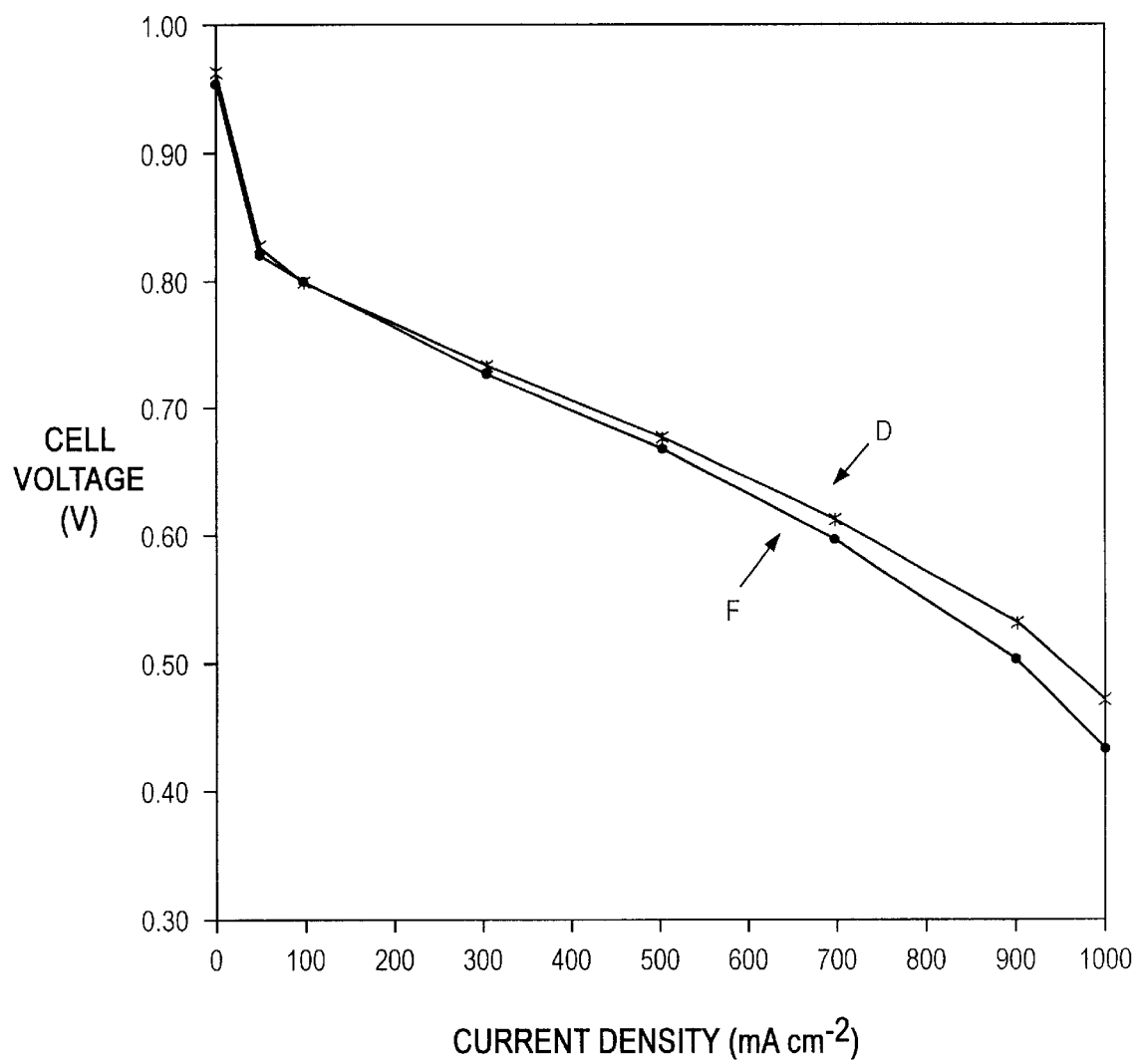
FIG. 4 is a composite plot of fuel cell voltage as a function of current density for $HNO_3$ treated catalyst sample D and for the untreated sample F of Example 2.
Figure 5:
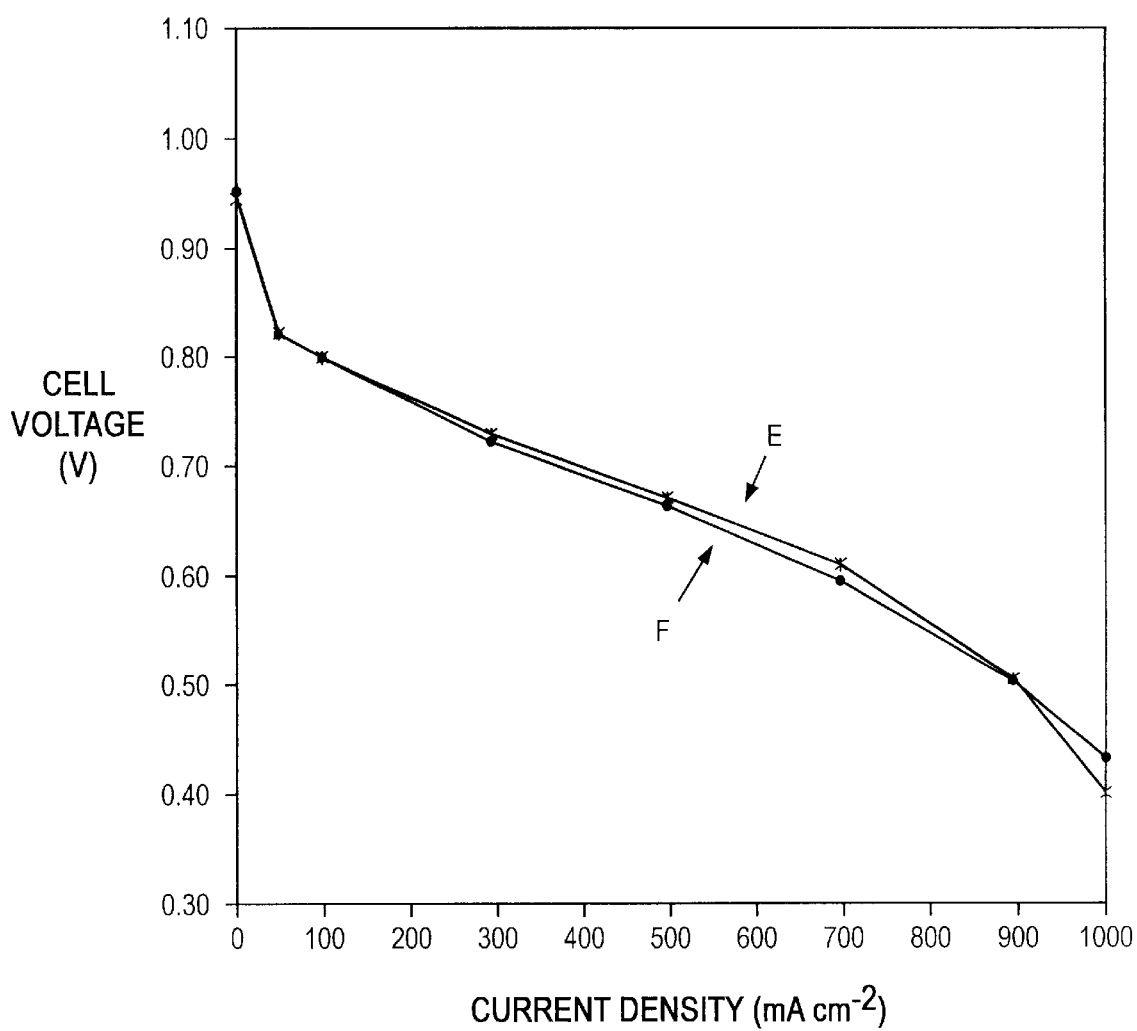
FIG. 5 is a composite plot of fuel cell voltage as a function of current density for $H_3PO_4$ treated catalyst sample E and for the untreated sample F of Example 2.

In a like manner, cathodes were made using each sample and test fuel cells were made with these cathodes. Again, the fuel cells were operated at 80° C. on pure hydrogen and air and the cell voltage versus current density characteristics for each were determined. FIG. 4 compares the performance of the $HNO_3$ treated sample D against untreated sample F. FIG. 5 compares the performance of the $H_3PO_4$ treated sample E against untreated sample F. In this example, while the $HNO_3$ treated sample is significantly better than the untreated sample, the $H_3PO_4$ treated sample does not show much improvement. At the highest current density tested, the $H_3PO_4$ treated sample E appears slightly worse than the untreated sample, perhaps indicative of a flooding problem. Thus, it appears that this room temperature impregnation treatment was insufficient to successfully treat this specific carbon-supported catalyst with $H_3PO_4$.

EXAMPLE 3

Testing similar to Example 2 was carried out, except that the carbon-supported catalyst employed was a commercially available product of Johnson-Matthey comprising 20% by weight platinum on Vulcan furnace black XC72R™ carbon support. Sample G was treated this time with 4 M $HNO_3$ (20 mL acid solution/g carbon-supported catalyst) at 60° C. for 1 hour. Sample H was left untreated for comparative purposes.

Figure 6:
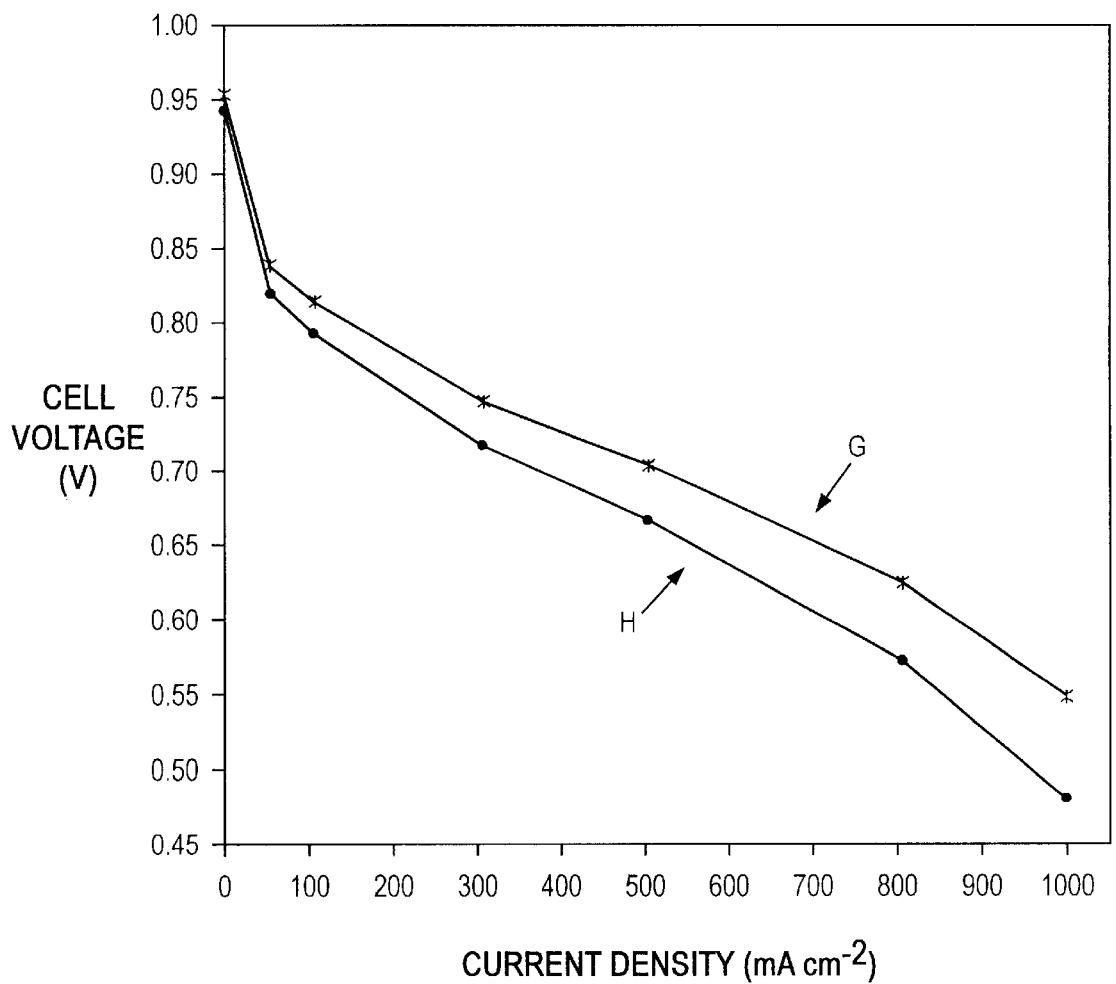
FIG. 6 is a composite plot of fuel cell voltage as a function of current density for $HNO_3$ treated catalyst sample G and the untreated sample H of Example 3.

Again, cathodes were made using each sample and test fuel cells were made and operated as in the preceding Examples. FIG. 6 compares the performance of the treated sample G against untreated sample H. The treated sample shows a substantial improvement over that of the untreated sample.

Some additional characteristics of the treated and untreated samples were determined in this Example. The pore size distributions of each sample were determined by mercury intrusion. FIG. 7 shows the pore size distributions expressed as rate of change of pore volume with log pore diameter versus pore diameter.

The pH, electrochemical surface area of the Pt (ECA), effective platinum surface area (EPSA) and utilization characteristics were also determined for the treated and untreated samples and the results are shown in the Table below. The pH was determined by the aforementioned ASTM test. ECA was determined by electrochemically stripping adsorbed CO from the Pt surface from a sample mounted on gold gauze in 0.5 M sulfuric acid electrolyte. EPSA was determined by CO stripping voltammetry on a fuel cell electrode sample using 1% CO in nitrogen as the cathode gas. The utilization was then calculated by dividing the EPSA by (ECA * electrode loading in grams Pt per m² electrode) as mentioned above.

|  | pH | ECA ($m^2$/g Pt) | EPSA | Utilization (%) |
| --- | --- | --- | --- | --- |
| Untreated | 5.29 | 205 (average of 2 measurements) | 170 (average of 3 measurements) | 26 |
| Treated | 2.44 | 158 | 227 | 44 |

As expected, the pH of the carbon-supported catalyst was reduced substantially by the acid treatment. Also, as expected, the EPSA was substantially increased by the acid treatment. Unexpectedly, however, it appears that the ECA was reduced by the treatment. The increase in utilization is actually much greater than expected since the ECA has decreased significantly, suggesting some loss of Pt surface. Nonetheless, a net benefit was observed in a fuel cell application.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A solid polymer fuel cell electrode comprising a carbon-supported catalyst wherein the surface of the carbon-supported catalyst comprises sufficient acidic surface oxide groups such that the pH of the carbon-supported catalyst is less than 5.

2. The solid polymer fuel cell electrode of claim 1 wherein the catalyst comprises platinum.

3. The solid polymer fuel cell electrode of claim 1 wherein the carbon support comprises an acetylene or furnace black.

4. The solid polymer fuel cell electrode of claim 1 wherein the pH of the carbon-supported catalyst is less than 3.

5. The solid polymer fuel cell electrode of claim 1 additionally comprising an ionomer in intimate contact with the carbon-supported catalyst.

6. A solid polymer fuel cell electrode comprising a carbon-supported catalyst wherein the carbon-supported catalyst has been chemically oxidized with a solution comprising an oxidizing species such that the pH of the carbon-supported catalyst is less than 5.

7. The solid polymer fuel cell electrode of claim 6 wherein the oxidizing species is selected from the group consisting of $HNO_3$, $H_3PO_4$, $KMnO_4$, $KClO_3$, HF, or $(NH_4)_2S_2O_8$.

8. The solid polymer fuel cell electrode of claim 7 wherein the oxidizing species is $HNO_3$ and the concentration of the species in the solution is greater than 4 M.

9. The solid polymer fuel cell electrode of claim 8 wherein the chemical treatment is performed at a temperature of at least 20° C.

10. The solid polymer fuel cell electrode of claim 9 wherein the chemical treatment is performed for at least 1 hour.

11. The solid polymer fuel cell electrode of claim 7 wherein the oxidizing species is $H_3PO_4$ and the concentration of the species in the solution is greater than 5 M.

12. The solid polymer fuel cell electrode of claim 11 wherein the chemical treatment is performed at a temperature at least 100° C.

13. The solid polymer fuel cell electrode of claim 12 wherein the chemical treatment is performed for at least 1 hour.

14. The solid polymer fuel cell electrode of claim 6 additionally comprising a substrate wherein the carbon-supported catalyst is applied to the substrate after performing the chemical treatment.

15. A solid polymer fuel cell membrane electrode assembly comprising an electrode of claim 1.

16. A solid polymer fuel cell comprising an electrode of claim 1.

17. The solid polymer fuel cell of claim 16 wherein the electrode is the cathode of the fuel cell.

18. The solid polymer fuel cell of claim 16 wherein a gaseous reactant is supplied to the electrode in the fuel cell.

19. A solid polymer fuel cell membrane electrode assembly comprising an electrode of claim 6.

20. A solid polymer fuel cell comprising an electrode of claim 6.

21. A method for improving the performance of a solid polymer fuel cell, the method comprising incorporating a carbon-supported catalyst in an electrode of the fuel cell wherein the surface of the carbon-supported catalyst has sufficient acidic surface oxide groups such that the pH of the carbon-supported catalyst is less than 5.

22. A method for improving the performance of a solid polymer fuel cell, the method comprising the steps of:
   (a) chemically oxidizing a carbon-supported catalyst with a solution comprising an oxidizing species such that the pH of the carbon-supported catalyst is less than 5; and
   (b) incorporating the carbon-supported catalyst in an electrode of the fuel cell.

23. The method of claim 22 comprising the further steps of:
   (c) preparing an ionomer ink comprising an ionomer solution and the oxidized carbon-supported catalyst; and
   (d) incorporating the ionomer ink in the electrode.

24. The method of claim 23 wherein the ionomer solution is an aqueous solution of a poly(perfluorosulphonic acid).

25. The method of claim 22 comprising the further steps of:
   (c) washing the oxidized carbon-supported catalyst in water;
   (d) filtering the oxidized carbon-supported catalyst from the wash water;
   (e) drying the oxidized carbon-supported catalyst filter cake;
   (f) grinding the oxidized carbon-supported catalyst filter cake to obtain free-flowing oxidized carbon-supported catalyst.

26. The method of claim 25 wherein the drying step is performed below 80° C.

27. The method of claim 25 wherein the drying step is performed in air.

* * * * *